W. R. YEAGLE.
SNAP HOOK.
APPLICATION FILED MAY 31, 1911.
1,025,666.
Patented May 7, 1912.
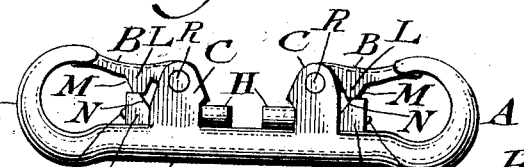
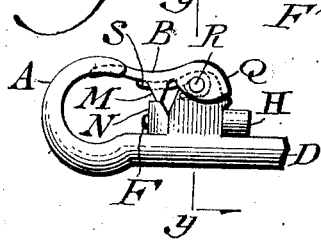
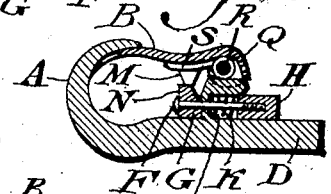
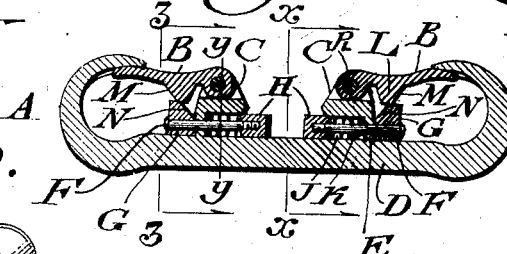
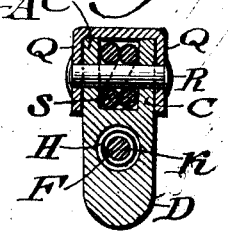
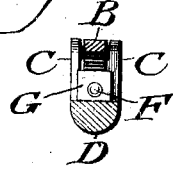
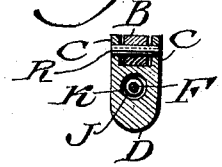
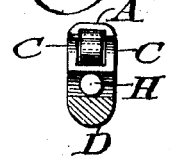
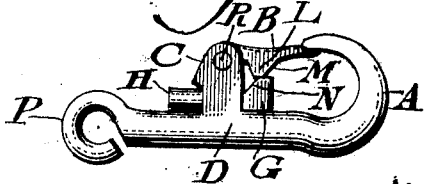
WITNESSES
INVENTOR
Walter R. Yeagle
BY
ATTORNEYS

UNITED STATES PATENT OFFICE.

WALTER R. YEAGLE, OF EDDINGTON, PENNSYLVANIA.

SNAP-HOOK.

1,025,666.     Specification of Letters Patent.     Patented May 7, 1912.

Application filed May 31, 1911. Serial No. 630,467.

*To all whom it may concern:*

Be it known that I, WALTER R. YEAGLE, a citizen of the United States, residing at Eddington, in the county of Bucks, State of Pennsylvania, have invented a new and useful Snap-Hook, of which the following is a specification.

My invention consists of a snap hook having a hook proper, a tongue adapted to close said hook proper, and a member adapted to engage said tongue and hold it positively in closed position.

It consists also of details of construction as will be hereinafter described and pointed out in the claim.

The invention is satisfactorily illustrated in the accompanying drawings, but the important instrumentalities thereof may be varied, and so it is to be understood that the invention is not limited to the specific arrangement and organization shown and described.

Figure 1 represents a side elevation of a snap hook embodying my invention. Fig. 2 represents a longitudinal section thereof. Fig. 3 represents a transverse section on line $x-x$ Fig. 2. Fig. 4 represents a transverse section on line $y-y$ Fig. 2. Fig. 5 represents a transverse section on line $z-z$ Fig. 2. Figs. 6 and 7 represent side elevations of other embodiments of my invention. Fig. 8 represents a longitudinal section of Fig. 7. Fig. 9 represents a perspective view of a portion of Fig. 7 detached. Fig. 10 represents a section on line $a-a$ Fig. 7, on an enlarged scale.

Similar letters of reference indicate corresponding parts in the figures.

Referring to the drawings:—A designates the hook proper of the device and B the closing tongue thereof, said tongue being mounted on the ears C which latter are connected with the shank D from which said hook A extends. In the cross bar E which connects the ears C is an opening which is occupied by the rod F, which is slidable in the longitudinal direction of the shank D and has secured to it on the end toward the hook A the block G, and on the other end the knob or head H, it being noticed that said ears C extend upwardly from the top of said cross bar, which latter is raised from the shank D, forming on the side away from the hook the recess J which contains the spring K, which encircles the portion of the rod F which passes through said recess and bears against the cross bar E and the head H, so as to hold the block G in closing or normal position, as will be hereinafter again referred to.

On the inner or under side of the tongue B is the lug L, the same having an oblique or slanting side M, which latter faces the hook A. The block G has an oblique or slanting side N, the same facing the ear C, which sides M N are adapted to come in contact, as will be hereinafter again referred to. It will be noticed that in the normal or closed position of the tongue B, the block G, contacts with the lug L and as said block is subject to the pressure of the spring J and the lug rests on said block, it is evident that the tongue will be held against the nose of the hook A and so be closed tightly and positively. When the tongue is to be released, the head H is pushed in when the block G is removed from beneath or behind the lug L, and as the latter is no longer supported, the tongue then dropping, and the snap hook as such is opened for purposes requiring the same. When the head H is let go, the spring J restores the block G to its normal position, its oblique face N riding on the oblique face M of the lug and so pressing the latter as to raise or move the tongue toward the nose of the hook A. As the block continues its return motion, its outer edge, in the present instance, its upper edge passes under the outer or lower edge of the lug L and so moves the lug and consequently the tongue B to full closing extent, the tongue being supported again on the block G, and so is rendered positively immovable until the advance operation of the head H is repeated.

It will be noticed that the block G and the head H are sustained on the shank D in all of their positions, thus rendering the device in those respects compact and firm. The head H is adapted to enter the recess J and so is guided therein true in its motions, while being movable on the shank D as has been stated.

It is to be noted that the recess J which is in the base of the ears C is entirely inclosed so as to prevent ingress of foreign matter thereinto.

In Figs. 1 and 2, the device is shown double ended while in Fig. 6, it is shown single ended with an eye or ring P on the end opposite to the hook for attachment of a strap, chain, or other desired article of the kind.

In order to cover the axial portion of the tongue B there is formed on the heel end of said tongue the sheath Q, which is somewhat of the form of a scoop shaped body having its top wall adapted to cover the tops of the ears C, and its side walls adapted to straddle the side portions of the ears C about the pintle R of said tongue while also freely inclosing said ears, the end portions of said pintle passing through said sheath without however affecting the movements of the tongue in opening and closing, it being noticed that said sheath protects the axial portion of the tongue and particularly the space existing between the ears C from the entrance of dust, dirt and foreign matters generally.

In some cases, it may be desirable to prevent the dropping or opening movement of the tongue when the block G is removed from the lug L. For this purpose, there is secured to the pintle R, the spring S which bears upwardly and outwardly against the underside of the said tongue so as to hold the latter in closed position, it being evident by pressing said tongue toward the shank the spring will be overcome and so the tongue will leave its seat on the hook A and assume an open position for purposes requiring the same.

Having thus described my invention what I claim as new and desire to secure by Letters Patent, is:—

In a snap hook, a hook proper and a shank carrying the same, a pivoted tongue with a lug extending inwardly therefrom and having an oblique surface on the side facing said hook proper, a pair of ears on said shank on which said tongue is mounted, a cross bar joining said ears forming a recess opening away from said hook proper, there being an opening in the wall of the cross bar from said recess toward the hook proper, a rod slidably mounted in said opening, a head on one end of said rod and movable in said recess, a spring contained in said recess, and a block on the other end of said rod and having an oblique surface on the side facing the cross bar, the action of the spring upon the head forcing the block toward the cross bar and beneath said lug to lock the tongue in closed position.

WALTER R. YEAGLE.

Witnesses:
WILLIAM G. KRATZ,
STANLEY Q. BECKER.